United States Patent
DeGrendel et al.

(10) Patent No.: US 12,411,923 B2
(45) Date of Patent: Sep. 9, 2025

(54) METHOD AND SYSTEM FOR ENABLING A VEHICLE FUNCTION BASED ON A USER PROFILE

(71) Applicant: FCA US LLC, Auburn Hills, MI (US)

(72) Inventors: Glen DeGrendel, Commerce Township, MI (US); Giuliana Zennaro, Turin (IT)

(73) Assignee: FCA US LLC, Auburn Hills, MI (US)

( * ) Notice: Subject to any disclaimer, the term of this patent is extended or adjusted under 35 U.S.C. 154(b) by 253 days.

(21) Appl. No.: 18/296,485

(22) Filed: Apr. 6, 2023

(65) Prior Publication Data
US 2024/0338430 A1    Oct. 10, 2024

(51) Int. Cl.
*G06F 21/32*    (2013.01)
*B60R 25/01*    (2013.01)
*B60R 25/25*    (2013.01)

(52) U.S. Cl.
CPC ............ *G06F 21/32* (2013.01); *B60R 25/01* (2013.01); *B60R 25/252* (2013.01); *B60R 25/255* (2013.01)

(58) Field of Classification Search
CPC ..... B60R 25/252; B60R 25/255; B60R 25/01; G06F 21/32
See application file for complete search history.

(56) References Cited

U.S. PATENT DOCUMENTS

| | | | |
|---|---|---|---|
| 10,600,270 B2 * | 3/2020 | Hassani | B60R 25/23 |
| 11,370,391 B1 * | 6/2022 | Gammelgard | B60W 60/00256 |
| 11,370,449 B2 * | 6/2022 | Collins, II | G06V 20/59 |
| 2017/0357980 A1 * | 12/2017 | Bakun | G06Q 20/027 |
| 2018/0103022 A1 * | 4/2018 | Tokunaga | H04L 63/0853 |
| 2018/0181772 A1 * | 6/2018 | Shchur | G06V 20/52 |
| 2022/0128422 A1 * | 4/2022 | Cech | B60Q 9/00 |
| 2022/0324490 A1 * | 10/2022 | Akash | G06V 20/597 |
| 2024/0242644 A1 * | 7/2024 | Szczerba | G02B 30/56 |

FOREIGN PATENT DOCUMENTS

| | | |
|---|---|---|
| CN | 111439269 A | 7/2020 |
| EP | 3562389 A1 | 11/2019 |

* cited by examiner

*Primary Examiner* — Mohamed A. Wasel
(74) *Attorney, Agent, or Firm* — Jeremy J. Klobucar

(57) ABSTRACT

An occupant identification system for enabling a vehicle and method of operating the same includes a plurality of biometric sensors generating sensor signals. A controller is programmed to determine static data from the biometric sensors, determine dynamic biometric data over time from the biometric sensors corresponding to occupant body movements, determine a sensor fusion based on the static data and the dynamic biometric data, compare the sensor fusion to a user profile and enable a vehicle function when the sensor fusion corresponds to the user profile.

16 Claims, 4 Drawing Sheets

METHOD AND SYSTEM FOR ENABLING A VEHICLE FUNCTION BASED ON A USER PROFILE

FIELD

The present disclosure relates to a biometric authentication system and, more particularly, to a multimodal biometric authentication system for enabling functions of an automotive vehicle.

BACKGROUND

This section provides background information related to the present disclosure which is not necessarily prior art.

Biometrics have been used for non-automotive applications for many years. Voice recognition, fingerprint scanning, facial recognition and iris recognition are examples of biometric data that have been used to provide authentication.

Automotive vehicles are operated under many conditions and harsh environments. Such conditions often result in false rejections in traditional biometric recognition.

SUMMARY

This section provides a general summary of the disclosure, and is not a comprehensive disclosure of its full scope or all of its features.

In one aspect of the disclosure, an occupant identification system for a vehicle includes a plurality of biometric sensors generating sensor signals. A controller is programmed to determine static data from the biometric sensors, determine dynamic data over time from the biometric sensors, determine a sensor fusion based on the static data and the dynamic data, compare the sensor fusion to a user profile and enable a vehicle function when the sensor fusion corresponds to the user profile.

In another aspect of the disclosure, a method includes determining static data from biometric sensors, determining dynamic data over time from biometric sensors, determining a sensor fusion based on the static data and the dynamic data, comparing the sensor fusion to a user profile; and enabling a vehicle function when the sensor fusion corresponds to the user profile.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

In the following system, both static biometric data from sensors and dynamic biometric data from sensors are used to enable and disable various functions of the vehicle.

Figure 1:
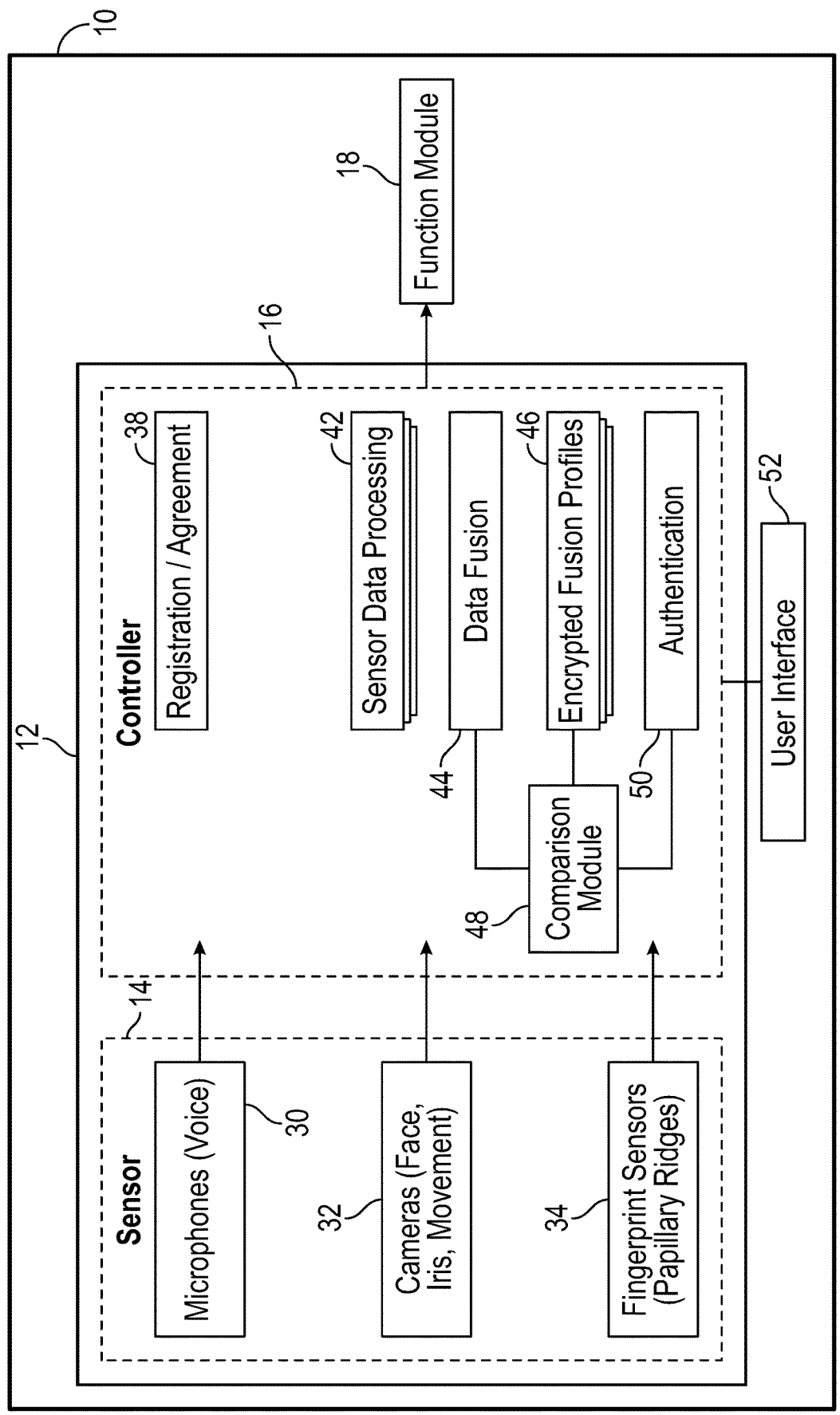
FIG. 1 is block diagram of the occupant identification system according to the present disclosure.

Referring now to FIG. 1, a vehicle 10 has an occupant recognition system 12. The occupant recognition system 12 has a plurality of biometric sensors 14 that generate biometric sensor signal and are in communication with a controller 16. The controller 16 is in communication with a function module 18. Ultimately, the biometric sensors 14 are used to determine dynamic data and static data to allow the controller to determine the identity of an occupant to enable and disable functions of the vehicle 10 at the function module 18.

The sensors 14 may include various types of biometric sensors including a microphone 30, a camera 32 or plurality of cameras and a fingerprint sensor 34. The microphone 30 generates an electrical signal corresponding to sound received. The microphone 30 may be a piezoelectric device. The electrical sound signal is communicated to the controller 16. The electrical sound signal may have various frequency components that may be used to identify a speaker or occupant.

The camera 32 is an image sensor and may be a visible light camera that uses a charge couple device to convert visible light to electrical image signals. The one or more cameras may be directed to potential occupant positions including being directed to a driver front seat, the passenger front seat and rear passenger seat positions. The present system may be used to identify more than one occupant. For example, the front passenger or the driver of a vehicle may be identified. The camera 32 may detect visible light as well as non-visible light. The cameras 32 may have a resolution so that various facial features such as but not limited to the eyes, eyelids, eyebrows, nose, mouth, teeth, hair, dimples, hairlines, ears, facial shape, cheek bones, birthmarks and the like can be recognized. Likewise, the cameras 32 may detect and image the iris of the eyes. A system may only select certain item for identification.

The cameras may receive images over time so that dynamic sensor data is generated. Dynamic sensor data is determined over time and can be used alone or in combination with static sensor data to determine the identity of an occupant. Dynamic sensor data may correspond to various movements which correspond to personal traits or personal mannerisms. The camera 32 may provide a plurality of pictures or video to the controller 16 so that various movements can be determined. The camera may provide dynamic biometric data, such as facial features such as but not limited to eye movement (eyeball movement, eyelid movement), brow movement, twitches and mouth movement. Further, the movements may also include various movements of the body including hand gestures, neck movements touching of various parts of the body by the hands and the like.

Fingerprint sensors 34 may be used to detect the papillary ridges in a fingerprint. The fingerprint sensors 34 are typically touched so that the papillary ridges may be detected. An electrical fingerprint signal corresponding to the fingerprint is generated.

One or more cameras 32 may be directed to any of a plurality of occupant positions within the vehicle. That is, more than one camera may be used to detect an occupant.

The controller 16 has a plurality of modules or circuitry disposed therein for performing various functions. The controller 16 may be microprocessor-based and is programmed to perform the various functions set forth below. The controller 16 may also be formed of discrete circuitry such as an application specific integrated circuit (ASIC) for performing the functions. The controller 16 may have memory and a timer for storing data received from the sensors and dynamic data as well as calculations.

A registration/agreement module 38 is used for registering various users and forming biometric profile for the users. The biometric profiles may be developed from static biometric data from the biometric sensors 30, 32, 34. For example, an occupant or operator of the vehicle may be requested to speak or say particular words so that a voice biometric profile may be generated. Likewise, for static biometric data from the camera, the occupant may be requested to position their face in front of the camera in different positions or angles. For fingerprint registration, the fingerprints of a particular occupant may be input to the system. Ultimately, the registration/agreement module 38 may encrypt and store data in the encrypted fusion profile memory 46. Dynamic biometric data for the vehicle occupant may be developed over time to build a user or occupant profile.

A sensor data processing module 42 may process the data from the sensors 30, 32, 34. The sensor data processing module 42 may filter the data or sample the data according to various known analog or digital processing techniques. Ultimately, the data from the sensor data processing module 42 is provided to a data fusion module 44. The data fusion module 44 obtains the data from the various sensors statically as well as dynamically. That is, the camera data from the camera 32 may provide data over time so that dynamic data is obtained.

Encrypted occupant sensor fusion profiles 46 are stored within the controller 16 associated with the memory therewith during the registration process. The encrypted fusion profiles 46 may use the static biometric data described above together with a dynamic biometric data obtained over time to determine occupant movement. That is, the sensor fusion profiles may change over time. The data fusion forms a plurality of points that are ultimately compared to received or current fusion sensor data. The data fusion of the various data from the sensors as well as the encrypted fusion profiles are compared in a comparison module 48. The data points in the user profiles are compared with current sensor fusion data points. When a sufficient number of data points from the user profile correspond to a received current sensor fusion, a user or occupant can be identified. Ultimately, the comparison module may lead to authentication and identification of an occupant of the vehicle. Identification and authentication of an occupant is performed in the authentication module 50.

Various functions may be enabled by the function module 18. The function module 18 represents various types of functions that may be enabled in the vehicle, including but not limited to, enabling the starting of the vehicle, opening the doors of the vehicle, and providing various restrictions on the operation. For example, the operation of the vehicle may be restricted by the function module 18. For example, the operation of the vehicle above a particular speed may be restricted to operating below a predetermined speed such as 140 kph for a particular operator. Another function that may be enabled is limiting the volume on the radio or entertainment system. Another example is an unrecognized occupant may be prevented from operating the vehicle. Further, warnings may be generated when the vehicle is operated outside of a particular area.

A user interface 52 such as a touch screen, buttons, switches or dials may be used to input different types of data, or initiate various operations.

Figure 2:
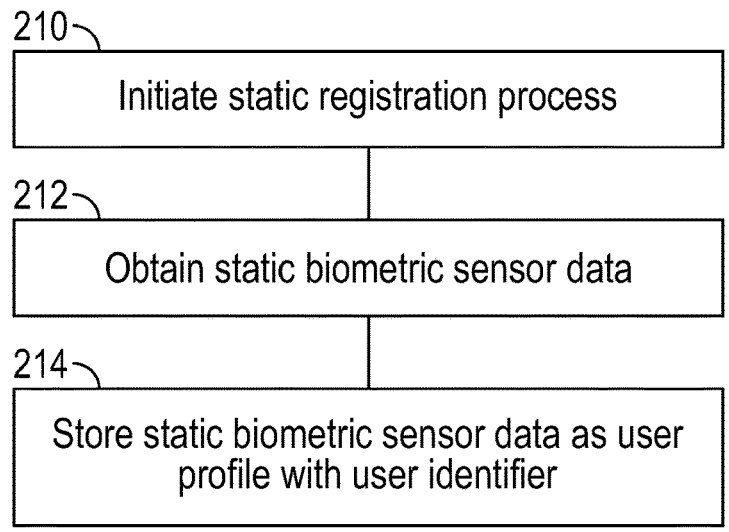
FIG. 2 is a flowchart of a method for obtaining a static biometric sensor profile.

Referring now to FIG. 2, a flowchart of a method for initiating the static registration process is set forth. In step 210, the static initiation process is initiated. This may be performed when the vehicle is new or a new occupant desires access to operate functions of the vehicle. The user interface 52 illustrated above may provide various alphanumeric identifiers or button pushes from the user interface to initiation the process. In step 212, static biometric sensor data may be obtained. Static biometric sensor data, as mentioned above, may include voice signals from the microphone 30, camera signals from one or more cameras directed to an occupant from the camera sensor 32, fingerprint sensor signals from the fingerprint sensor 34. In step 214, the static biometric sensor data is stored as a sensor fusion user profile within the memory along with a user identifier. The user identifier may be an alphanumeric identifier that corresponds the user. A plurality of users that corresponds to potential occupants or operators of the vehicle may be stored and restrictions may be provided or functions may be enable based upon the identification of a user or occupant.

Figure 3:
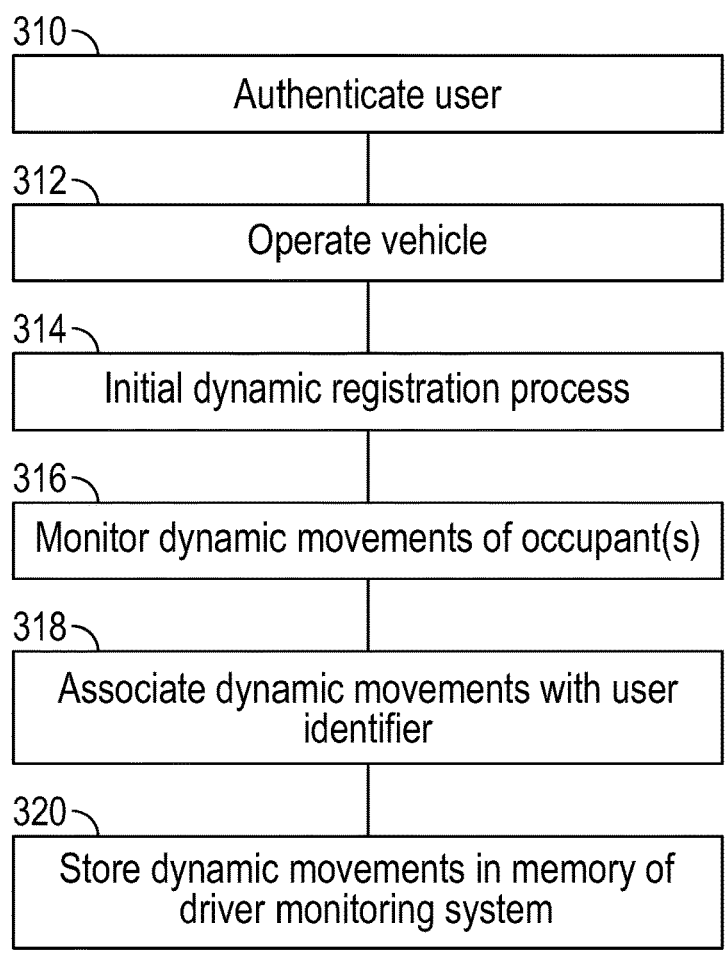
FIG. 3 is a flowchart of a method for obtaining a dynamic biometric data profile.

Referring now to FIG. 3, a method for obtaining dynamic sensor data may be performed. That is, the dynamic sensor data and the characteristics of the occupant movements determined from the dynamic sensor data may be identified. In step 310, a user, such as occupant or an operator of a vehicle, may be authenticated using static data. In this manner, the identity of the person and therefore the dynamic data associated with that person or user may be determined. In step 312, the vehicle is operated in a normal manner. The microphone 30 and/or the camera 32 may provide dynamic data to the controller 16. In step 314, the dynamic registration process is initiated once the vehicle is underway. The dynamic data is used to determine mannerisms of the operator may therefore be determined. In step 316, the dynamic movements of the occupant are monitored and when repeated may be confirmed as a mannerism for the occupant.

In step 318, the dynamic movements may be associated with a user identifier. The dynamic movements are determined over time and calculated. For example, the type of eye movement, the blinking of the eyes, the movement of the mouth, the location of the head, the movement of the eyeballs, the use of the seatbelt or not a seatbelt and other dynamic movements or micromovements may be observed and confirmed over time. For example, when a movement is repeated more than a predetermined number of repetitions, the personal nature of the movement may be confirmed When the movements are consistently performed, they may be associated with the user identifier as part of the sensor fusion user profile. In step 320, the dynamic occupant movements are stored in the memory of the driver monitoring system. The storing of the dynamic movements and the static biometric data may be stored in the encrypted sensor fusion user profile 46. The sensor fusion profile module 46 may have encrypted fusion profiles of dynamic data and static data for each of the users of the vehicle.

Figure 4:
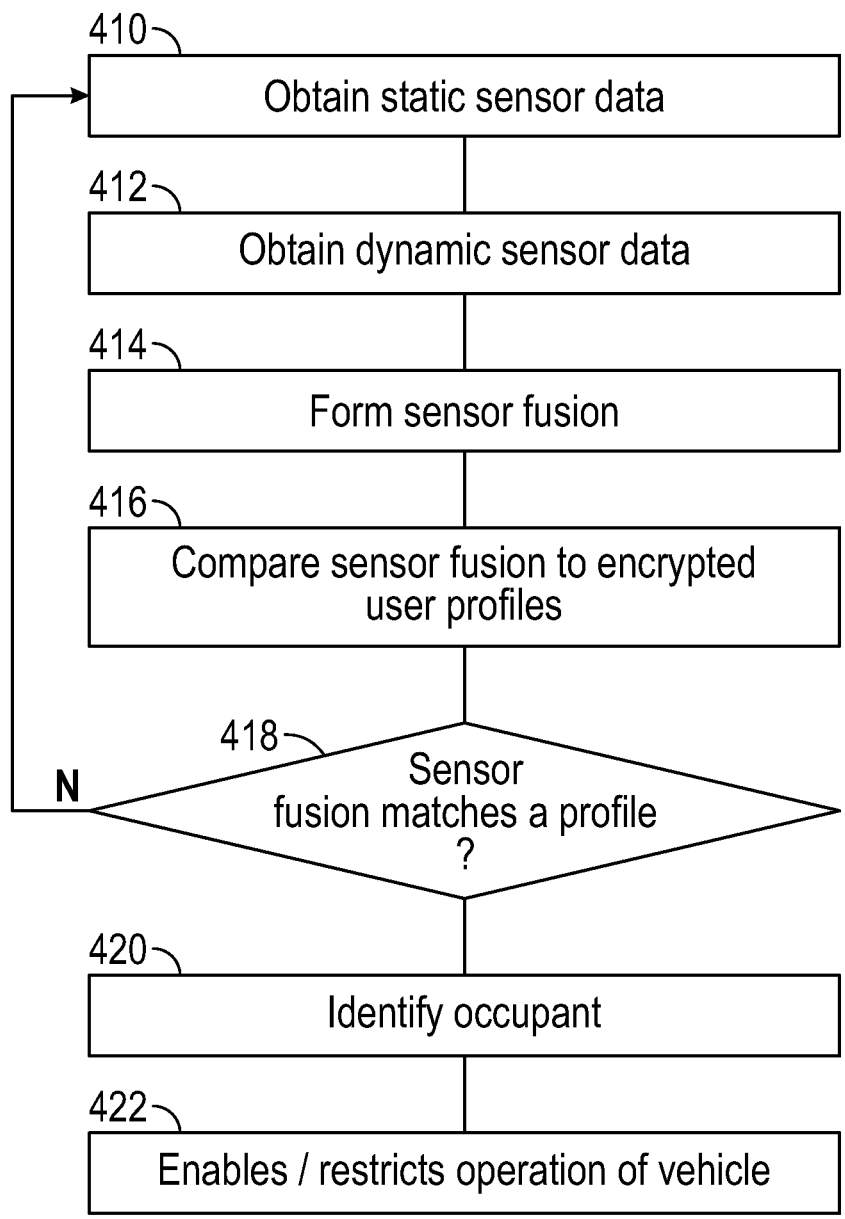
FIG. 4 is a method for operating the system using static and dynamic biometric sensor data.

Referring now to FIG. 4, one method for operating the vehicle using static and dynamic sensor data is performed. In step 410, static sensor data is obtained from the biometric sensors 30, 32, 34 described above. In step 412, dynamic sensor data is obtained over time. Both the static sensor data and the dynamic sensor data are biometric sensor data. In step 414, the static sensor data and the dynamic sensor data are combined together in a sensor fusion. That is, the static sensor data and the dynamic sensor data over time are used together to obtain the sensor fusion of current sensor data. The sensor fusion, as mentioned above a plurality of data points. In step 416, the current sensor fusion data is compared to the encrypted user profiles stored within the controller 16. That is the data points in the user profiles are compared to the current data points of the current sensor data sensor fusion. In step 418, when the current sensor data sensor fusion matches the data points of a sensor fusion profile, an occupant is identified in step 420. Step 422 enables an operation of the vehicle or restricts operation of a function of the vehicle based on the identity of the occupant.

Referring back to step 418, when the sensor function does not match a user data fusion profile, the system may continuously obtain sensor data and data sensor data to identify an occupant by starting again at step 418.

Figure 5:
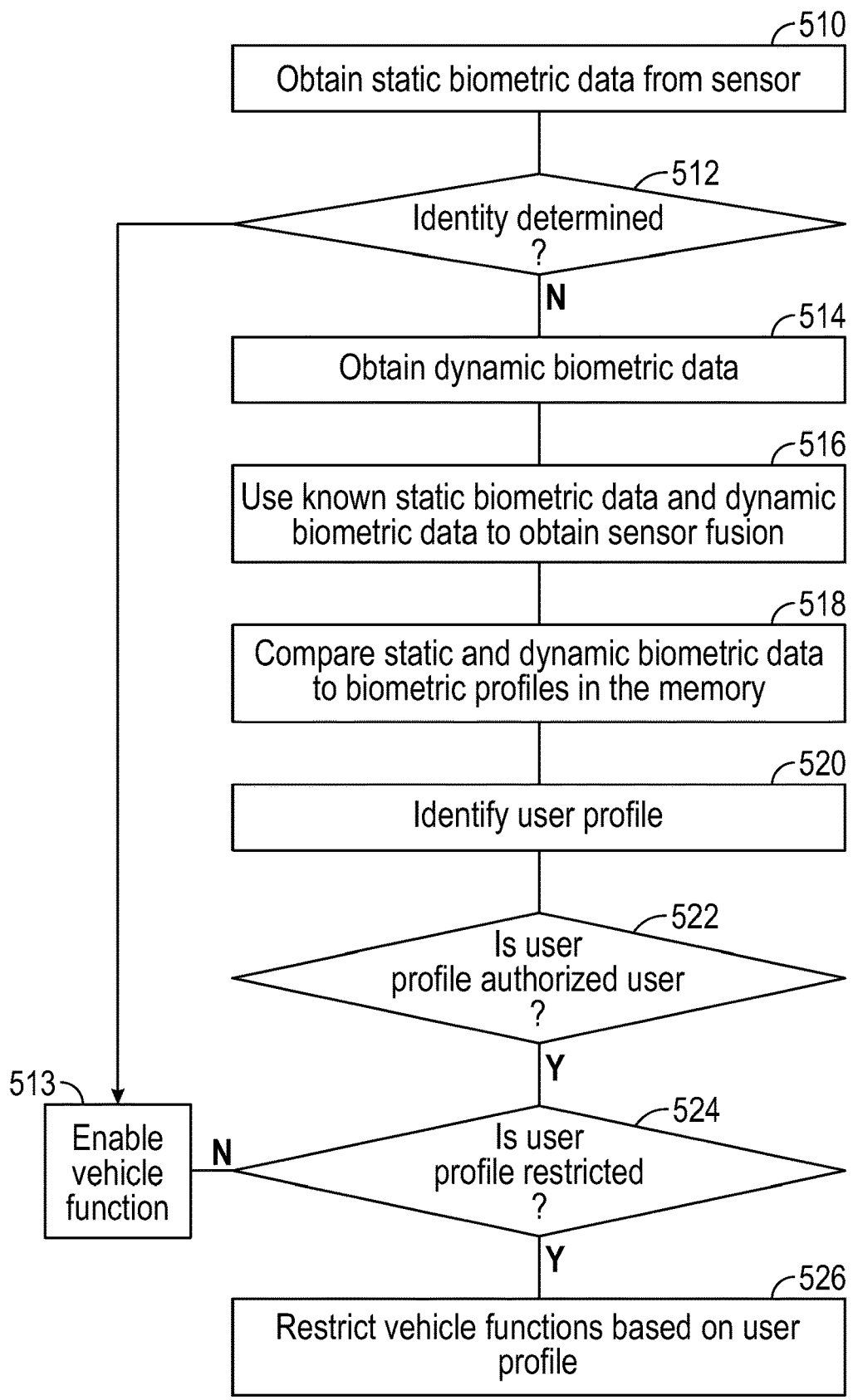
FIG. 5 is an alternate method for operating the vehicle with static biometric data and dynamic biometric data used as a backup.

Referring now to FIG. 5, an alternate method for enabling or disabling a vehicle function is set forth. In this example, the static data may be used unless enough data is not available from the static sensors. For example, if the fingerprint sensor is fouled or the microphone 30 is not operating, other data such as dynamic data from the camera may be used.

In step 510, static data is obtained from the sensors. As mentioned above, all the static sensors may be not be available to form a current sensor data fusion with enough data points. If the identity can be determined in step 512 from the current data sensor fusion and a stored sensor fusion profile, a vehicle function may be enabled in step 513. However, when the identity cannot be determined in step 512, the dynamic biometric data may be obtained over time in step 514. For example, various movements of the user may be determined over time by the camera and recognized by the controller 16. In step 516, the sensor fusion of static biometric data and dynamic biometric data is determined to obtain a current sensor data fusion. In step 518, the current dynamic and static biometric data in the current data sensor fusion are compared to the biometric profiles in the fusion profiles 46 of the controller of FIG. 1. In step 520, a user profile may be identified based upon comparing the current data sensor fusion (with the dynamic sensor data) to the sensor fusion profiles for various occupants in the fusion profile memory 46. In step 522, the list of authorized users in the authentication module 50 may be determined. The user profile identified in step 520 may be compared with the authorized users in step 522. When a user is authorized, restrictions may be determined in step 524. If the user profile is not restricted in step 524, step 513 enables a vehicle function such as the starting of the vehicle or various other functions of the vehicle. In step 524, when the user profile is restricted, step 526 restricts vehicle functions based upon the user profile. As mentioned above, the vehicle speed, the operating area of the vehicle and the volume of the radio are examples of functions that may be restricted.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An occupant identification system for a vehicle comprising:
   a plurality of biometric sensors generating sensor signals;
   a controller programmed to determine static data from the biometric sensors;
      determine dynamic biometric data over time from the biometric sensors, the dynamic biometric data corresponding to occupant body movements over time;
      determine a sensor fusion based on the static data and the dynamic biometric data;
      compare the sensor fusion to a user profile; and
      enable a vehicle function when the sensor fusion corresponds to the user profile.

2. The occupant identification system of claim 1 wherein the controller is programmed to determine dynamic data for updating the user profile while operating the vehicle.

3. The occupant identification system of claim 1 wherein the biometric sensors comprise at least one of a fingerprint sensor, a microphone and an image sensor.

4. The occupant identification system of claim 1 wherein the biometric sensors comprise two of a fingerprint sensor, a microphone and an image sensor.

5. The occupant identification system of claim 1 wherein the biometric sensors comprise a fingerprint sensor, a microphone and an image sensor.

6. The occupant identification system of claim 1 wherein comparing the sensor fusion to the user profile comprises comparing the sensor fusion to an encrypted user profile.

7. The occupant identification system of claim 1 wherein the controller is programmed to determine the sensor fusion based on the static data comprises the controller determining the sensor fusion based on the dynamic data and static data when enough static data is not available to determine the user profile.

8. The occupant identification system of claim 1 wherein the controller is programmed to enable the vehicle function comprises the controller programmed to start the vehicle.

9. A method comprising:
   determining static data from biometric sensors;
   determining dynamic biometric data over time from the biometric sensors, the dynamic biometric data corresponding to occupant body movements over time;
   determining a sensor fusion based on the static data and the dynamic data;
   comparing the sensor fusion to a user profile; and
   enabling a vehicle function when the sensor fusion corresponds to the user profile.

10. The method of claim 9 further comprising determining dynamic data for updating the user profile while operating the vehicle.

11. The method of claim 9 wherein determining static data comprises determining static data from the biometric sensors comprising at least one of a fingerprint sensor, a microphone and an image sensor.

12. The method of claim 9 wherein determining static data comprises determining static data from the biometric sensors comprising a fingerprint sensor, a microphone and an image sensor.

13. The method of claim 9 wherein determining static data comprises determining static data from the biometric sensors comprising a fingerprint sensor, a microphone and an image sensor.

14. The method of claim 9 wherein comparing the sensor fusion to the user profile comprises comparing the sensor fusion to an encrypted user profile.

15. The method of claim 9 wherein determining the sensor fusion based on the static data comprises determining the sensor fusion based on the dynamic data and static data when enough static data is not available to determine the user profile.

16. The method of claim 9 wherein enabling the vehicle function comprises starting the vehicle.

\* \* \* \* \*